Aug. 29, 1944.  E. F. P. JIMMES  2,357,203
MOTOR VEHICLE TOP CARRIER
Filed Sept. 4, 1941  3 Sheets-Sheet 1
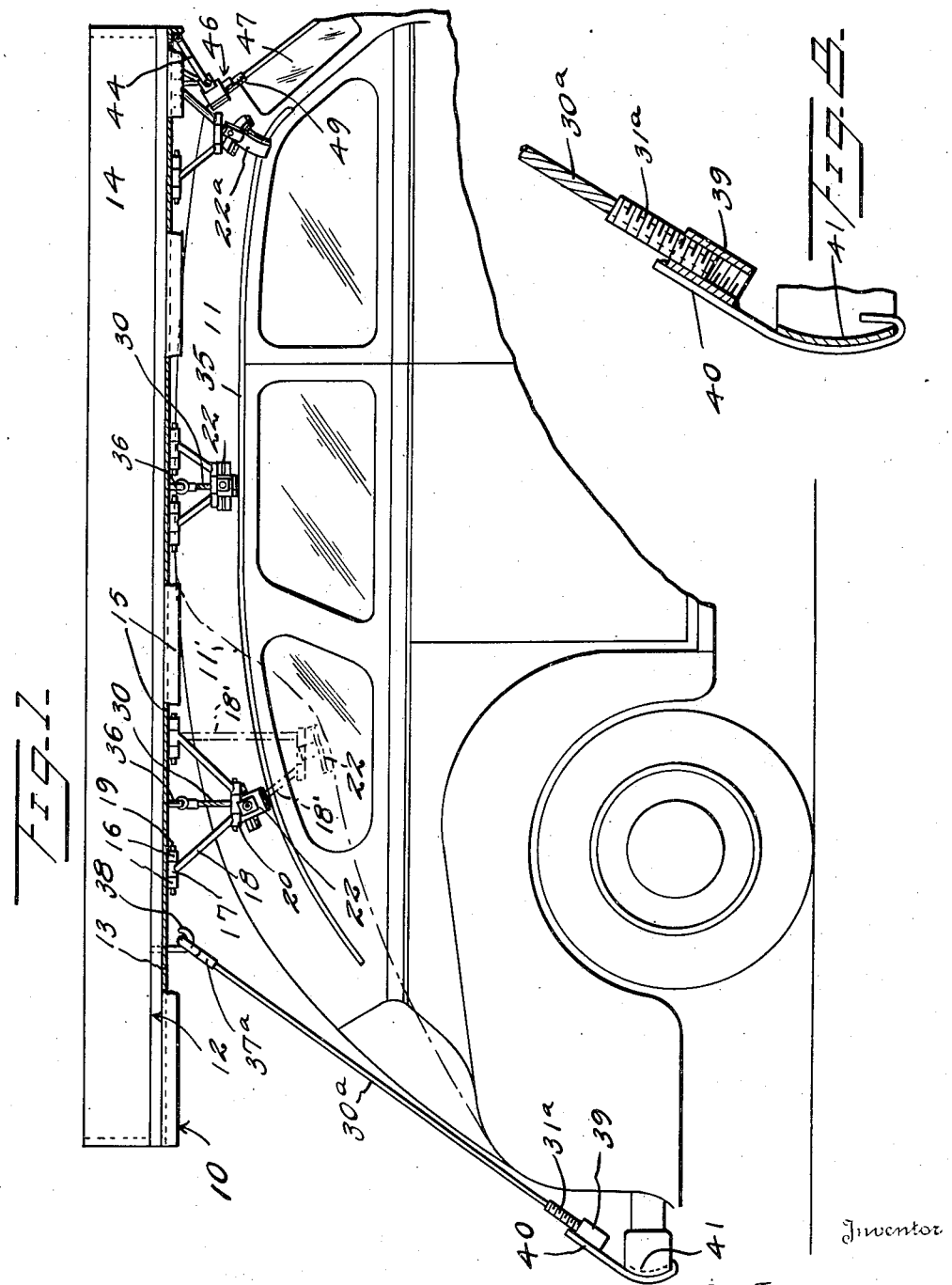
Inventor
E.F.P. Jimmes
By L. F. Randulph
Attorney

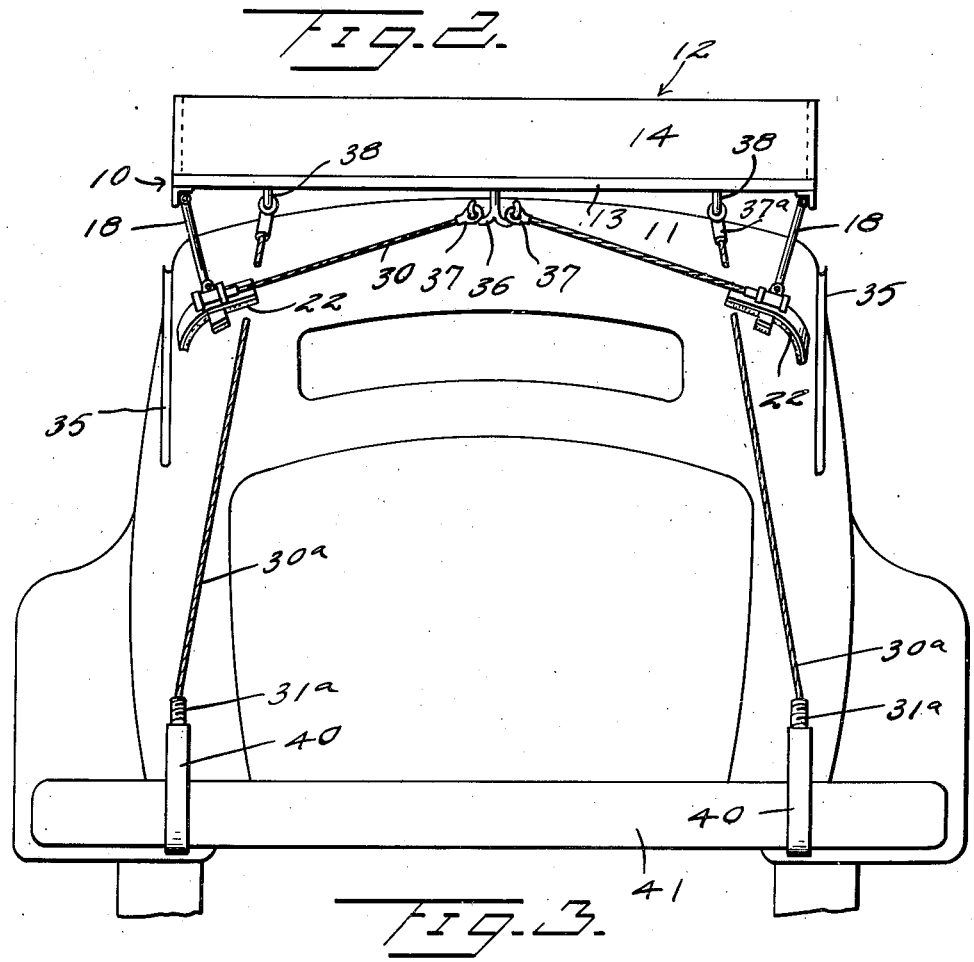
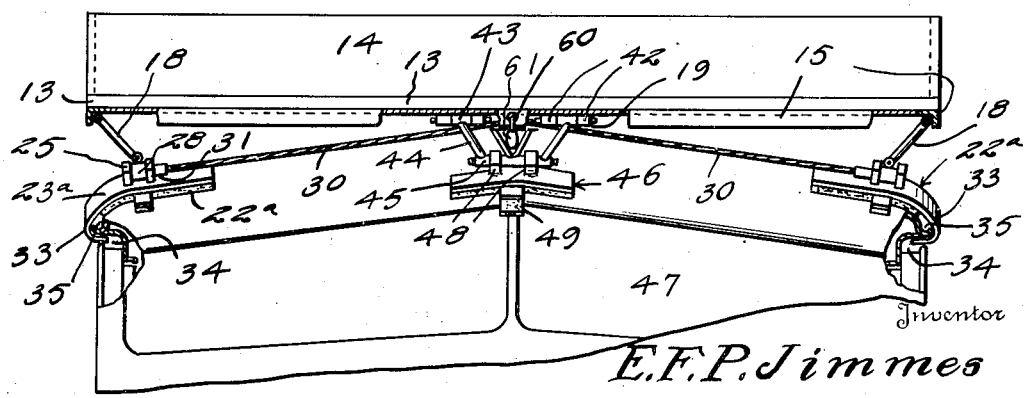

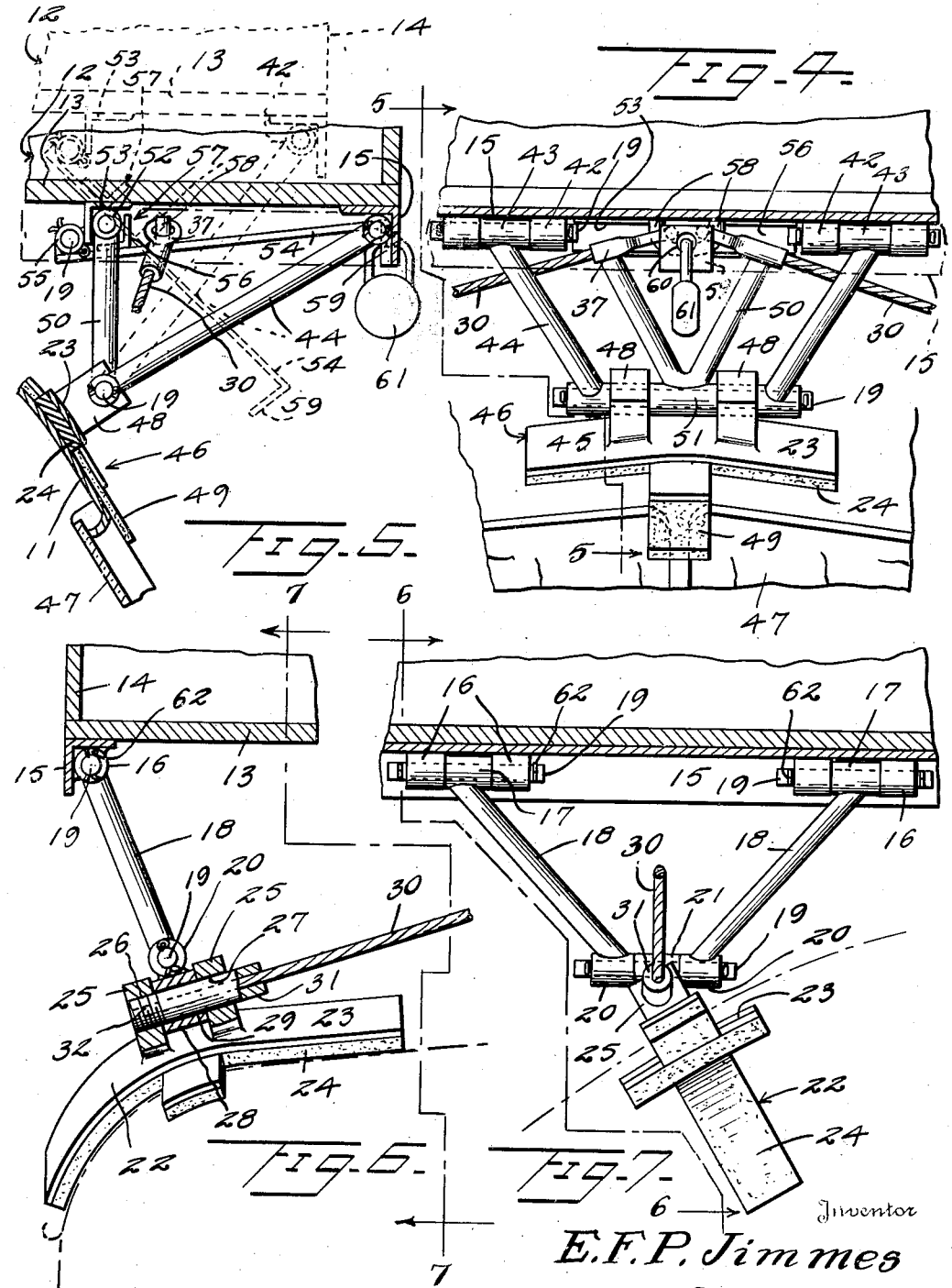

Patented Aug. 29, 1944

2,357,203

UNITED STATES PATENT OFFICE 2,357,203

MOTOR VEHICLE TOP CARRIER

Earl F. P. Jimmes, Milwaukee, Wis.

Application September 4, 1941, Serial No. 409,575

2 Claims. (Cl. 224—29)

This invention relates to a novel carrier structure adapted to be mounted on the top of a motor vehicle to provide a carrier for luggage and the like, and which is so constructed that it may be readily positioned, without the use of tools, on a motor vehicle top and securely retained in position thereon in a manner so that it will not mar the finish of the top, and at the same time will not in any way obscure the visibility of the operator of the vehicle, towards the front, sides or back.

Other objects of the invention are: to provide a carrier which, when not in use, can be suspended in a garage above an automobile so that it can be readily lowered into a position to rest on the top of the automobile; to provide a carrier mounting so constructed that the forces tending to dislodge the carrier from the top of the motor vehicle will counteract one another; to provide a carrier that can be readily attached to or detached from the top of the motor vehicle by one person and which when applied can be locked against removal or displacement; to provide a carrier mounting which is adjustable to maintain the proper tension and which is self-equalizing; to provide a mounting which will not interfere with the opening of doors or trunk and which can be adjusted to accommodate it to vehicle tops of different contours including sedans, coaches and coupes; and to provide visual indicator means, arranged to be clearly visible to the operator from the inside of the vehicle, to indicate the position of the carrier thereon, so that any movement of the carrier relatively to the vehicle top may be quickly and easily ascertained.

Other objects and advantages of the invention will hereinafter become more fully apparent from the following description of the drawings, which illustrate a preferred embodiment thereof, and wherein—

Figure 1 is a side elevational view, partly broken away, showing the carrier applied to a sedan or coach top of an automobile, in full lines, and to the top of a coupe, in dotted lines;

Figure 2 is a rear elevational view showing the carrier applied to a sedan or coach top;

Figure 3 is a front elevational view, partly in section, of the carrier in position;

Figure 4 is an enlarged fragmentary front elevational view, partly broken away, of the intermediate portion of the forward end of the carrier;

Figure 5 is a longitudinal vertical sectional view of the portion shown in Figure 4, taken substantially along a plane indicated by the line 5—5 of Figure 4;

Figure 6 is an enlarged fragmentary side elevational view of a portion of one side of the carrier looking in a direction toward the forward end thereof, taken substantially along a plane indicated by the line 6—6 of Figure 7;

Figure 7 is a longitudinal vertical sectional view of the part shown in Figure 6, taken substantially along a plane indicated by the line 7—7 of Figure 6, and Figure 8 is an enlarged fragmentary side elevational view, partly in vertical section, showing the means for attaching the carrier to the rear bumper of the vehicle.

Referring more particularly to the drawings, wherein like reference characters designate like or corresponding parts throughout the different views, 10 designates generally the carrier structure in its entirety, shown in Figure 1 mounted on the top 11 of a sedan or coach. The carrier structure 10 includes a body portion, designated generally 12, which comprises a floor or platform 13 having upright side and end walls 14 and which is adapted to contain luggage or other articles to be carried on the carrier structure 10.

The floor 13 has secured to the under side thereof, along its side edges and forward end, angle members 15 which are attached thereto so as to open inwardly and downwardly thereof, as best seen in Figures 5 and 6. The angle members 15, which are attached to the side edge portions of the floor 13 are provided with a plurality of pairs of sleeves or barrel portions 16 which are suitably secured therein. The sleeves of each pair of sleeves are disposed in end to end spaced relationship to one another, and a sleeve or barrel portion 17 of a supporting leg 18 is disposed between the sleeves of each pair of sleeves 16 and pivotally connected to the carrier body 12 by means of a hinge pin 19 which extends through the pair of sleeves 16 and the sleeve 17 disposed therebetween. The supporting legs 18 are also provided with sleeves or barrels 20 at their opposite, free ends which are disposed substantially parallel to the sleeves 17. The legs 18 have their longitudinal axes disposed obliquely to their sleeves 17 and 20, and said legs are arranged in converging pairs, as seen in Figures 1 and 7. A sleeve 21 is disposed between the sleeves 20, of each converging pair of legs 18 and is pivotally connected thereto by means of a hinge pin 19.

A foot member or pad, designated generally 22, and best seen in Figures 6 and 7, is connected to each of the pairs of supporting legs 18. The foot members 22 are each cross-shaped and each includes an outer rigid section 23, preferably of metal, and an inner or under part or section 24, preferably of rubber and which is suitably secured to the section 23. The section 23 is provided with spaced upwardly projecting apertured lugs 25 and 25A, one of which is provided with a threaded opening 26, and the other of which is provided with a slightly larger unthreaded opening 27. The sleeves 21 are each connected to a sleeve 28 which is disposed crosswise of the sleeve 21 and therebeneath and which is positioned between a pair of the lugs 25, as seen in Figure 6. The sleeve 28 is provided with a longitudinal bore 29 which is adapted to aline with an opening 27.

A plurality of flexible members 30 are each provided at an end thereof with a stud 31 which is suitably secured thereto and which is provided with a threaded free end 32. The studs 31 are adapted to extend loosely through an opening 27, and a bore 29 and to threadedly engage an opening 26 for connecting a flexible member 30 to each of the foot members 22 and for pivotally connecting each of the foot members 22 to a pair of legs 18. It will be readily apparent that the last mentioned hinge connection and the hinge connection formed by the sleeves 20 and 21 form a universal joint between each pair of supporting legs 18 and its foot member 22 to permit any angular adjustment of the foot member relatively to the supporting legs.

As best seen in Figure 1, three pairs of supporting legs 18 are disposed along each side of the floor or platform 13. The two rear pairs of legs on each side of the body 12 are provided with foot members 22, as shown in Figures 6 and 7, and as previously described. The forward pairs of legs 18 are provided with slightly modified foot members 22a which differ from the foot members 22 in that the outer ends of their sections 23a, as seen in Figure 3, are extended and turned inwardly to form hooks 33, which are adapted to fit into the upper parts of the front door openings of the vehicle, as seen at 34. To provide sufficient space for the hooks 33 to fit into the upper parts of the door openings 34, when the doors are closed, the panels, not shown, between the gutters 35, at the sides of the top 11, and the doors can be removed. The hooks 33 are bent outwardly sufficiently so that when applied, as seen in Figure 3, they will not distort the gutters 35. The remaining portions of the foot members 22a and the foot members 22 are disposed on the shoulders of the vehicle top 11, above the gutters 35 with their cushioning members 24 engaging the top 11 to prevent the foot members or pads 22 and 22a from marring the finish of the top. The two rear pads or foot members 22 engage the downwardly sloping rear ends of the shoulders of the top 11, as best seen in Figure 2, and are disposed at a lower level than the other foot members 22 and 22a and, as the platform or floor 13 is adapted to be disposed in substantially a horizontal plane the rear pairs of legs 18A are longer than the intermediate and forward pairs of legs 18.

Double hooks 36 are mounted on the under side of and intermediate of the ends and near the rear end of the floor 13 and are disposed transversely of the body 12. The flexible members or cables 30 are provided with eyes 37 at their opposite ends for engaging the hook portions of the double hooks 36, as best seen in Figures 1 and 2, for limiting the outward swinging movement of the pairs of legs 18, which are disposed adjacent the rear and intermediate of the ends of the body 12, relatively to the floor 13. It will be readily apparent that by adjusting the screw connections of the studs 31 with the threaded openings 26 that the extent of the outward swinging movement of said legs 18 can be reduced or increased. It will thus be apparent that the cables 30 will hold the pads in engagement with the shoulders of the top 11 so that the supporting legs 18 will project outwardly and upwardly therefrom.

A pair of hooks 38 are secured in and depend from the under side of the floor 13 and are disposed in lateral alinement and rearwardly of the rearmost double hooks 36. A pair of cables or flexible members 30a have eyelets 37a at corresponding ends thereof which detachably engage the hooks 38. The studs 31a of the flexible members 30a are preferably threaded throughout their length to engage internally threaded sleeves 39 which are fastened longitudinally of the inner sides of hooks 40. Hooks 40 are adapted to engage around the outer side of the rear bumper 41 and to hook therebeneath for attaching the rear end of the carrier body 12 to the rear bumper, as best seen in Figures 1 and 2, and in detail in Figure 8.

Referring particularly to Figures 1, 3, 4 and 5, the angle member 15 which is disposed across the front of the body 12 is provided with two pairs of sleeves 42, similar to the sleeves 16 to receive sleeves or barrel portions 43, similar to the sleeves 17. Each pair of sleeves 42 is connected to a barrel portion 43 by means of a pintle or hinge pin 19. Each of the sleeves 43 forms an end of a supporting leg 44, similar to the legs 18, and having at the opposite, lower ends thereof sleeves 45, corresponding to the sleeves 20. A foot member or pad 46 is mounted on the downwardly sloping forward end of the top 11 and centrally thereof and above and adjacent the windshield 47. The foot member 46 is provided with laterally spaced lugs 48 having alined openings through which is adapted to extend an elongated pivot pin 19. The sleeves 45 loosely engage the ends of the last mentioned pivot pin 19 and are swingably mounted relatively to the lugs 48 and are disposed on the outer sides thereof.

The foot member or pad 46 includes an outer rigid section 23 and an inner cushioning section 24A, which latter rests upon the forward part of the top 11. The forward end of the longitudinally disposed part of the cushioning section 24A is extended, as seen in Figure 4, and is disposed over the upper, central portion of the windshield 47, to form a visual indicator 49, as will hereinafter become apparent.

A substantially V-shaped supporting member 50 is provided with a sleeve 51 at its lower end or apex and which is disposed substantially at a right angle to the longitudinal axis of the supporting member 50 and which is adapted to be disposed between the lugs 48 for loosely engaging the hinge pin 19 which extends therethrough. A rod 52 is attached, adjacent its ends, to the free ends of the legs of the V-shaped supporting member 50.

Referring particularly to Figure 5, a supporting member 53, which is angular in cross section, is secured to the under side of the floor 13, near the forward end thereof, and is disposed transversely thereof and arranged to open downwardly and forwardly. Rod 52 is free of the supporting member 53. A lever 54 is provided with a sleeve 55 on the upper side of one end thereof, and the rear side of the depending portion of the member 53 is provided with one or more similar sleeves, not shown, for receiving a pintle 19 which extends through said sleeves and the sleeve 55 for pivotally mounting the lever 54 on the member 53. The lever 54 is provided with a transversely disposed angle member 56, adjacent its pivoted end, which faces upwardly and rearwardly and which is arranged to cooperate with a portion of the member 53, when the lever 54 is in a raised position, to form a substantially rectangular confining portion 57 in which the intermediate portion of the rod 52 is adapted to be disposed for holding the V-shaped supporting member 50 in place and in an operative position relatively to the carrier body 12. The lever 54 is also provided on its upper side with a transversely disposed U-shaped member 58 which is disposed near the angle member 56 and between said member 56 and the free end of the lever 54. The upturned free ends of the U-shaped member 58 form hooks adapted to be detachably engaged by the eyes 37 of the flexible members 30 which are adjustably connected to the forward foot members or pads 22a. The lever 54 is provided with a downturned free end 59 which is adapted to engage against the rear side of the depending portion of the forward angle member 15, when the lever 54 is in its raised, full line position of Figure 5. When said lever 54 is thus disposed, its portion 59 and the portion of said member 15, against which it engages, are provided with apertures 60 which are in alinement and which are adapted to receive a padlock 61 for locking the carrier 10 securely in place on the vehicle top 11, as will hereinafter become apparent.

Each of the pintles or hinge pins 19 is provided with exposed apertured ends for receiving cotter pins 62 for detachably retaining the hinge pins or pintles in engagement with the sleeves or barrel portions through which they extend.

In dotted lines, in Figure 1, the outline of the back portion of a coupe top is indicated at 11'. It will be readily obvious that the intermediate supporting legs 18 and foot members 22 and the forward supporting legs 18 and foot members 22a will fit a coupe top 11', in the same manner that they will a sedan or coach top. However, for use with a coupe top 11' the rear supporting legs 18 are removed and replaced by longer supporting legs 18', as seen in dotted lines in Figure 1, and one of which is longer than the other, so as to position the two rear foot members 22 for engagement with the upper part of the trunk of the coupe and so that when thus positioned the rear supporting legs 18' will cooperate with the other supporting legs 18 to support the carrier body 12 in substantially a horizontal position, as shown in full lines in Figure 1.

Assuming that the carrier 10 has been lowered into a position above the sedan or coach top 11 and that the foot members or pads 22 are in engagement with the shoulders of the top 11, as seen in Figure 1, with the lever 54 in its released position, as seen in dotted lines in Figure 5, the forward pair of flexible members 30 will be sufficiently loose to permit the two forward foot members 22a to be hooked into the door openings 34, as seen in Figure 3. The remaining flexible members 30 being connected to the hooks 36 and the foot members 22, said foot members 22 will be prevented from swinging outwardly by the members 30 and will be held against inward movement by the slope of the shoulders of the top 11 to effectively support the weight of the carrier body 12. The flexible members 30a, after adjusting, have their hook portions 40 then attached to the rear bumper 41, adjacent the ends thereof, which operation will exert a downward pull on the rear end of the body 12 causing the forward end thereof to move upwardly from its full line to its dotted line position of Figure 5. The lever 54 is then swung upwardly until its member 56 engages the rod 52 after which the forward end of the body 12 is pulled downwardly to thereby cause it to swing downwardly and forwardly and back to its full line position of Figure 5. This will form the confining portion 57 for holding the V-shaped supporting member 50 in substantially an upright position and will position the supporting legs 44 so that they extend forwardly and are inclined upwardly. With the lever 54 thus swung upwardly to a raised position and the forward end of the body 12 pulled downwardly the openings 60 will be alined so that the padlock 61 can be applied thereby locking the forward end of the body 12 in its full line position of Figure 5. The raising of the lever 54 will tension the forward pair of flexible members 30 to securely position the foot members 22a in engagement with the forward portions of the shoulders of the top 11 and the door openings 34, so that the forward pairs of supporting legs 18 will then cooperate with the other supporting legs 18 for supporting the weight of the carrier body 12. The downward pull on the forward end of the body 12 will raise the rear end thereof to tension the flexible members 30a and to thereby tightly secure the carrier 10 on the vehicle top 11.

It will be readily apparent that the foot member 46 will be held fixedly in place relatively to the top 11 due to the fact that the supporting member 50 will prevent it from sliding downwardly or upwardly relatively to the top 11 and the supporting legs 44 will prevent it from swinging outwardly to thus effectively secure the forward end of the body 12 to the vehicle top.

When the vehicle, upon which the carrier 10 is mounted, moves forward, inertia is overcome and a forward motion of the carrier is maintained by the force exerted through the legs 44 to thereby prevent backward slippage of the carrier relatively to the top 11. Likewise, if the vehicle is backed any tendency of the carrier 10 to slide forwardly is prevented by the flexible members 30a. Lateral slippage is effectively prevented by the supporting legs 18 and pads 22 and 22a in combination with the flexible members 30a. It will be noted that when the carrier 10 is applied it will in no wise obstruct the visibility of the operator of the vehicle, on which it is mounted, either from the front, rear or sides and, as seen in Figure 2, will not interfere with the opening of the trunk of the vehicle or, as seen in Figure 3, will not prevent opening of the doors or windows.

The visual indicator 49 over the upper central part of the windshield 47 is in full view of the operator so that any movement of the carrier 10 relatively to the top 11 will be indicated to the operator by a movement of indicator 49.

Various modifications and changes are contemplated and may obviously be resorted to as only preferred embodiments of the invention have been disclosed.

I claim as my invention:

1. A structure of the class described comprising a carrier body, supporting legs pivoted thereto and depending therefrom, sleeves pivoted to the lower ends of said legs, foot members to rest on the upper surface of the motor vehicle top, said foot members having lugs between which the sleeves are disposed, and means to limit swinging movement of the legs relatively to the body connected to the latter and having portions mounted in the lugs and passing through the sleeves to form journals for the latter.

2. A structure of the class described comprising a carrier body, supporting legs pivoted thereto and depending therefrom, sleeves pivoted to the lower ends of said legs, foot members to rest on the upper surface of the motor vehicle top, said foot members having lugs between which the sleeves are disposed, and means to limit swinging movement of the legs relatively to the body connected to the latter consisting of cables having studs mounted in the lugs and screwthreaded to one of them and passing through the sleeves to form journals therefor.

EARL F. P. JIMMES.